US012687638B2

(12) United States Patent
Kwak et al.

(10) Patent No.: US 12,687,638 B2
(45) Date of Patent: *Jul. 21, 2026

(54) METHOD AND SYSTEM OF SIMULTANEOUS LOCALIZATION AND MAPPING BASED ON 2D LiDAR AND CAMERA

(71) Applicants: Hyundai Motor Company, Seoul (KR); Kia Corporation, Seoul (KR)

(72) Inventors: Dong Hwan Kwak, Hwaseong-si (KR); Sanghyeon Oh, Seoul (KR); Hyuntek Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 124 days.

This patent is subject to a terminal disclaimer.

(21) Appl. No.: 18/615,204

(22) Filed: Mar. 25, 2024

(65) Prior Publication Data

US 2025/0138192 A1     May 1, 2025

(30) Foreign Application Priority Data

Oct. 31, 2023     (KR) ........................ 10-2023-0147710

(51) Int. Cl.
| | | |
|---|---|---|
| *G01S 17/89* | (2020.01) | |
| *G06T 3/06* | (2024.01) | |
| *G06T 7/73* | (2017.01) | |
| *G06T 17/00* | (2006.01) | |

(52) U.S. Cl.
CPC ................ *G01S 17/89* (2013.01); *G06T 3/06* (2024.01); *G06T 7/75* (2017.01); *G06T 17/00* (2013.01)

(58) Field of Classification Search
CPC .......... G01S 17/06; G01S 17/86; G01S 17/89;
G01S 17/931; G06T 3/06; G06T 7/75;
G06T 17/86; G06T 2207/10028; G06T
2207/20212; G06T 2207/30252; G06S
7/4808; B60W 2420/403; B60W
2420/408
USPC ......................................................... 345/418
See application file for complete search history.

(56) References Cited

U.S. PATENT DOCUMENTS

| | | | | |
|---|---|---|---|---|
| 12,467,763 | B2 * | 11/2025 | Kwak ..................... | G06V 10/44 |
| 2009/0185741 | A1 * | 7/2009 | Nahari ................... | G06V 20/13 |
| | | | | 382/154 |
| 2020/0133272 | A1 * | 4/2020 | Chong ................. | G05D 1/0088 |
| 2020/0160559 | A1 * | 5/2020 | Urtasun ................ | G06N 3/084 |
| 2021/0063578 | A1 * | 3/2021 | Wekel ................... | G01S 17/894 |
| 2021/0272310 | A1 * | 9/2021 | Connell ................... | G06T 7/70 |

(Continued)

FOREIGN PATENT DOCUMENTS

| | | |
|---|---|---|
| KR | 20230018656 A | 2/2023 |

*Primary Examiner* — Prabodh M Dharia
(74) *Attorney, Agent, or Firm* — Slater Matsil, LLP

(57) ABSTRACT

A system and method of simultaneous localization and mapping can include loading a map to which 2D feature point data stored in a memory is bound, acquiring 2D LiDAR point data from a LiDAR equipped in a mobility, acquiring 3D observation feature point data by receiving a front image from a camera equipped on the mobility, reducing a dimension of the 3D observation feature point data to 2D observation feature point data, binding the 2D observation feature point data to the 2D LiDAR point data, and detecting an absolute position of the mobility based on the 2D observation feature point data bound to the 2D LiDAR point data and the map to which the 2D feature point data is bound.

20 Claims, 7 Drawing Sheets

(56)  References Cited

U.S. PATENT DOCUMENTS

| | | | |
|---|---|---|---|
| 2021/0278848 A1* | 9/2021 | An | G05D 1/0088 |
| 2021/0348927 A1* | 11/2021 | Imai | G06T 7/73 |
| 2022/0187428 A1* | 6/2022 | Liaqat | G05D 1/246 |
| 2022/0189054 A1* | 6/2022 | Kaiser | G06V 20/582 |
| 2022/0237925 A1* | 7/2022 | Kulkarni | G06T 7/20 |
| 2023/0043931 A1* | 2/2023 | Urtasun | G06N 3/045 |
| 2023/0057118 A1* | 2/2023 | Bankiti | G06T 7/20 |
| 2024/0077586 A1* | 3/2024 | Lee | G01S 17/931 |
| 2024/0089181 A1* | 3/2024 | Binet | G06F 11/202 |
| 2024/0221395 A1* | 7/2024 | Rezaei | G06V 10/764 |

* cited by examiner

FIG. 2

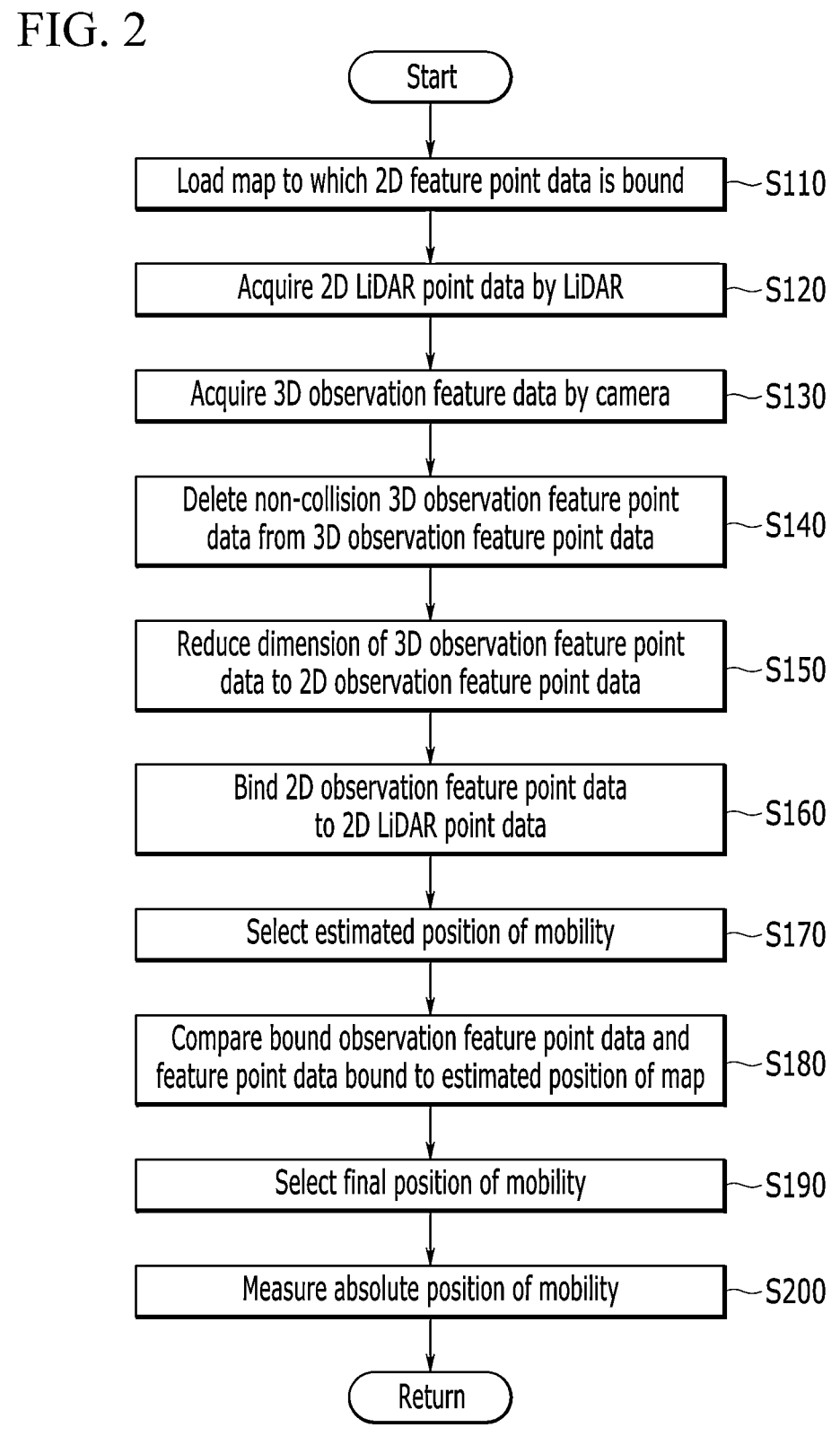

Start

Load map to which 2D feature point data is bound — S110

Acquire 2D LiDAR point data by LiDAR — S120

Acquire 3D observation feature data by camera — S130

Delete non-collision 3D observation feature point data from 3D observation feature point data — S140

Reduce dimension of 3D observation feature point data to 2D observation feature point data — S150

Bind 2D observation feature point data to 2D LiDAR point data — S160

Select estimated position of mobility — S170

Compare bound observation feature point data and feature point data bound to estimated position of map — S180

Select final position of mobility — S190

Measure absolute position of mobility — S200

Return

70

METHOD AND SYSTEM OF SIMULTANEOUS LOCALIZATION AND MAPPING BASED ON 2D LiDAR AND CAMERA

CROSS-REFERENCE TO RELATED APPLICATIONS

This application claims the benefit of Korean Patent Application No. 10-2023-0147710, filed on Oct. 31, 2023, which application is hereby incorporated herein by reference.

TECHNICAL FIELD

The present disclosure relates to a method and a system of simultaneous localization and mapping (SLAM).

BACKGROUND

Simultaneous localization and mapping (SLAM) can refer to a technology that simultaneously detects a mobility's current location and creates a map of a surrounding environment while exploring an unknown environment.

An autonomous driving mobility based SLAM for indoor environment of the related art acquires space information using a stereo vision or a light detection and ranging device (LiDAR), and then calculates movement information with a position detection sensor such as an encoder or an inertial sensor to create a map. However, a sensor for constructing space information, such as a vision or LiDAR has the disadvantage of being sensitive to illuminance and lacking resolution so that the sensor may create incorrect maps. Therefore, this may result in a collision accident of a mobility.

For example, if there is a chair or a table with thin legs in an indoor place, even though the LiDAR detects the thin legs, the thin legs are treated as a noise to be mostly deleted by correction during a mapping process. As a topographical feature is lost, it is difficult to perform the SLAM in the indoor environment having a plurality of similar space structures, such as offices.

The matters described in this background section are for a better understanding of the background of the present disclosure and may include matters that are not the related art already publicly known, in use, or available.

SUMMARY

The present disclosure relates to a method and a system of simultaneous localization and mapping (SLAM), and more particularly, can relate to a simultaneous localization and mapping method and system that binds an observation feature point observed by a camera to a two dimension (2D) LiDAR point and compare the observation feature point bound to the 2D LiDAR point with a map to which a feature point is bound to accurately localize the mobility and create a map based on the mobility localization.

Some embodiments of the present disclosure can provide a simultaneous localization and mapping (SLAM) method and system that binds an observation feature point observed by a camera to a 2D LiDAR point and compares the observation feature point bound to the 2D LiDAR point with a map to which a feature point is bound to accurately localize the mobility and create a map based on the mobility localization.

According to an example embodiment of the present disclosure, a simultaneous localization and mapping method includes loading a map to which 2D feature point data stored in a memory is bound, by a controller, acquiring 2D LiDAR point data from a LiDAR equipped in a mobility, by the controller, acquiring three dimension (3D) observation feature point data by receiving a front image of the mobility from a camera equipped in the mobility, by the controller, reducing a dimension of the 3D observation feature point data to 2D observation feature point data, by the controller, binding the 2D observation feature point data to the 2D LiDAR point data, by the controller, and detecting an absolute position of the mobility based on the 2D observation feature point data bound to the 2D LiDAR point data and the map to which the 2D feature point data is bound, by the controller.

The detecting of an absolute position of the mobility based on the 2D observation feature point data bound to the 2D LiDAR point data and the map to which the 2D feature point data is bound can further include selecting an estimated position of the mobility, comparing the bound observation feature point data with the feature point data bound to the estimated position of the map, and selecting a final position of the mobility.

The final position of the mobility can be selected by checking a similarity of the bound observation feature point data and the feature point data bound to the estimated position of the map.

The estimated position of the mobility can be selected by localization of the mobility.

The simultaneous localization and mapping method can further include updating the map to which the 2D feature point data is bound based on the absolute position of the mobility and the 2D observation feature point data bound to the 2D LiDAR point data, by the controller.

The simultaneous localization and mapping method can further include storing the updated map to which the 2D feature point data is bound in the memory, by the controller.

The simultaneous localization and mapping method can further include, before the reducing a dimension of the 3D observation feature point data to 2D observation feature point data, deleting non-collision 3D observation feature point data that does not collide with the mobility from the 3D observation feature point data, by the controller.

Specifications of the mobility can be stored in the memory and the non-collision 3D observation feature point data can be selected based on the specifications of the mobility.

According to an example embodiment of the present disclosure, a simultaneous localization and mapping system includes a LiDAR mounted in a mobility and configured to detect 2D LiDAR point data, a camera mounted in the mobility and configured to acquire a front image of the mobility, and a controller configured to load a map stored in a memory to which 2D feature point data is bound, receive the 2D LiDAR point data from the LiDAR, receive the image from the camera, acquire 3D observation feature point data from the image, reduce a dimension of the 3D observation feature point data to 2D observation feature point data, bind the 2D observation feature point data to the 2D LiDAR point data, and detect an absolute position of the mobility based on the 2D observation feature point data bound to the 2D LiDAR point data and the map to which the 2D feature point data is bound.

The controller can be further configured to select an estimated position of the mobility, compare the bound observation feature point data with the feature point data bound to the estimated position of the map, and select a final position of the mobility based on the comparison result.

The controller can be further configured to select the final position of the mobility by checking a similarity of the bound observation feature point data and the feature point data bound to the estimated position of the map.

The simultaneous localization and mapping system can further include a movement data sensor mounted in the mobility and configured to detect movement data of the mobility and the controller can be configured to select the estimated position of the mobility by localization of the mobility based on the 2D LiDAR point data or the mobility movement data.

The controller can be further configured to update the map to which the 2D feature point data is bound based on the absolute position of the mobility and the 2D observation feature point data bound to the 2D LiDAR point data.

The controller can be further configured to store the updated map to which the 2D feature point data is bound in the memory.

Before reducing the dimension of the 3D observation feature point data to the 2D observation feature point data, the controller can be further configured to delete non-collision 3D observation feature point data that does not collide with the mobility from the 3D observation feature point data.

Specifications of the mobility can be stored in the memory and the controller can be configured to select the non-collision 3D observation feature point data based on the specifications of the mobility.

According to some embodiments of the present disclosure, an observation feature point observed by a camera can be bound to a 2D LiDAR point and can be compared with a map to which a feature point is bound to accurately localize the mobility. Further, the map may be accurately created based on the accurate localization of the mobility.

Further, perhaps differing from a SLAM that uses an artificial neural network, the 2D LiDAR point and the observation feature point observed by the camera can be bound so that the accurate localization is possible without complex computation. Accordingly, a control board with an advanced computing ability can be not necessary and a central processing unit (CPU) that is mounted in the existing mobility may be used.

In addition, advantages and functionalities that may be achieved or predicted by some embodiments of the present disclosure will be disclosed directly or implicitly in the detailed description of some example embodiments of the present disclosure. That is, various advantages and functionalities may be predicted according to some example embodiments of the present disclosure and will be disclosed in the detailed description below.

BRIEF DESCRIPTION OF THE DRAWINGS

Example embodiments of the present specification can be better understood by referring to the following description in conjunction with the accompanying drawings in which like reference numerals can denote identical or functionally similar elements, in which:

FIG. 2 is a flowchart of a simultaneous localization and mapping method according to an example embodiment of the present disclosure;

Figure 1:
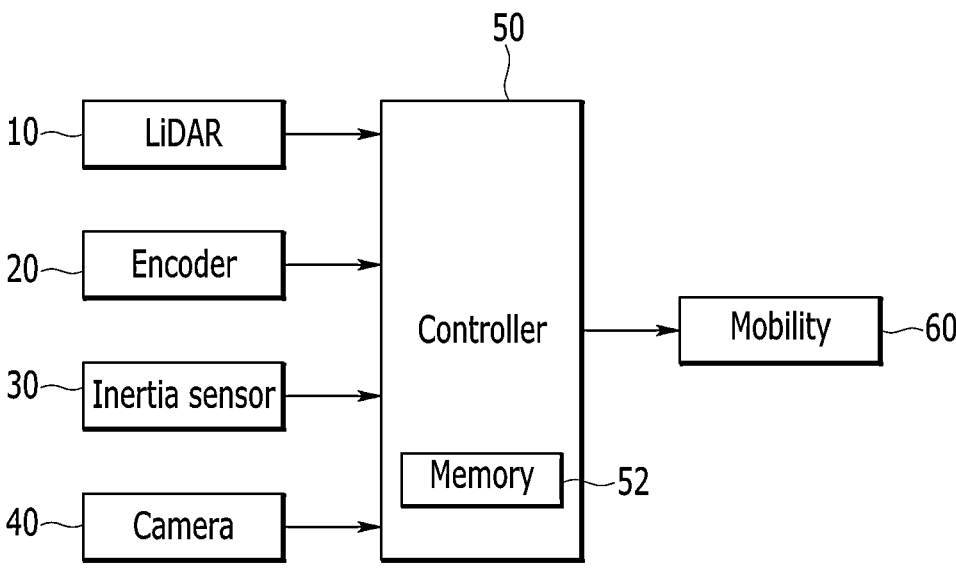
FIG. 1 is a block diagram of a simultaneous localization and mapping system according to an example embodiment of the present disclosure.

It can be understood that the drawings referenced above are not necessarily drawn to scale, and somewhat simplified expressions of various features illustrate basic principles of some embodiments of the present disclosure. For example, specific design features of some embodiments of the present disclosure can include a specific dimension, direction, position, and shape that may be partially determined by a specifically intended application and a usage environment.

DETAILED DESCRIPTION OF ILLUSTRATIVE EMBODIMENTS

As used herein, singular forms can also include plural forms, unless the context clearly indicates otherwise. The terms "include" and/or "including", when used herein, specify the presence of mentioned features, integers, steps, operations, constituent elements, and/or components, but such terms are also understood do not exclude presence or addition of one or more of other features, integers, steps, operations, constituent elements, components, and/or groups thereof. As used herein, the term "and/or" includes any one or all combinations of associated listed items.

A "mobility" or other similar terms used in the specification can include general land mobilities such as passenger vehicles including sports utility vehicles (SUVs), buses, trucks, tractors, and various commercial vehicles, marine mobilities including various boats and ships, and aerial mobilities including aircrafts and drones, and all objects that may move by receiving a power from a power source, for example. Further, a "mobility" or other similar terms used in the specification can include a hybrid mobility, an electric mobility, a plug-in hybrid mobility, a hydrogen power mobility, and a mobility of other alternative fuels (for example, fuels derived from sources other than petroleum), for example. As mentioned in the specification, a hybrid mobility can include a mobility having two or more power sources, for example, a gasoline powered and electric powered mobility. A mobility according to some embodiments of the present disclosure can include not only a mobility that is manually driven, but also remotely, autonomously, and/or automatically driven mobility.

Additionally, one or more of the following methods and embodiments thereof can be executed by at least one or more controllers. The term "controller" may refer to a hardware device including at least one memory and at least one processor. The memory can be configured to store code and program instructions, and the processor can be particularly programmed to execute code and program instructions to perform one or more processes or operations, as described in more detail below for example. The controller can control operations of units, modules, components, devices, or the like, as described herein. Further, the following methods may be executed by a device including a controller together with one or more other components as recognized by a person of an ordinary skill in the art.

Further, a controller of the present disclosure may be implemented as a non-transitory computer-readable recording medium including executable program instructions executed by at least one processor. Examples of computer-readable recording media can include ROM, RAM, compact disk (CD) ROM, magnetic tapes, floppy disks, flash drives, smart cards, and optical data storage devices, for example, but is not necessarily limited thereto. The computer-readable recording medium may also be distributed throughout a computer network so that program instructions may be stored and executed in a distributed manner, for example, on a telematics server or a Controller Area Network (CAN).

Hereinafter, example embodiments of the present disclosure will be described in more detail with reference to the accompanying drawings.

FIG. 1 is a block diagram of a simultaneous localization and mapping system according to an example embodiment of the present disclosure.

As illustrated in FIG. 1, a simultaneous localization and mapping (SLAM) system according to an example embodiment of the present disclosure can include a LiDAR 10, an encoder 20, an inertia sensor 30, a camera 40, a controller 50, and a mobility 60.

The LiDAR 10 can be mounted in the mobility 60 and can detect a time that a laser pulse reflected from an object (for example, a fixed topography and an obstacle) within a detection range of the LiDAR 10 returns after irradiating the laser pulse in front of the mobility 60 to detect information on the object, such as a distance from the LiDAR 10 to the object, and a direction, a speed, a temperature, a material distribution, and a concentration characteristic of the object. Here, the object may be another mobilities, persons, objects, pillars, or walls, which are present at the outside of the mobility 60 equipped with the LiDAR 10 as a sensor, but an embodiment of the present disclosure is not necessarily particularly limited to the type of the object. The LiDAR 10 can be connected to the controller 50 to detect 2D LiDAR point data (for example, 2D data of a plurality of LiDAR points) within the detection range and transmit the 2D LiDAR point data to the controller 50.

The encoder 20 can detect information on rotation of a driving motor or a wheel equipped in the mobility 60. The encoder 20 can be connected to the controller 50 to transmit the detected information on the rotation of the driving motor or the wheel to the controller 50. The controller 50 can calculate movement data of the mobility 60, such as a movement speed and/or a movement distance of the mobility 60 based on the information on the rotation of the driving motor or the wheel.

The inertia sensor 30 can detect information on a movement situation of the mobility 60 including a speed, a direction, a gravity, and an acceleration of the mobility 60. The inertia sensor 30 can be connected to the controller 50 to transmit the detected information on the movement situation of the mobility 60 to the controller 50. The controller 50 can detect or supplement the movement data of the mobility 60 based on the information on the movement situation of the mobility 60.

Both the encoder 20 and the inertia sensor 30 can be used as a movement data sensor that detects the movement data of the mobility 60, and only one of the encoder 20 and the inertia sensor 30 may be used as the movement data sensor. Further, the movement data sensor is not necessarily limited to the encoder 20 and the inertia sensor 30, and may be various sensors that detect the movement data of the mobility 60.

The camera 40 can be mounted in the mobility 60 and acquire a front image of the mobility 60 within a detection range of the camera 40. The camera 40 can be connected to the controller 50 to transmit the acquired image to the controller 50. The image can be configured by pixel data including a plurality of pixels. A size of the pixel data of the image may be (N*M) and N and M are natural numbers.

The controller 50 can receive the 2D LiDAR point data from the LiDAR 10, receive the information on the rotation of the driving motor or the wheel from the encoder 20, receive the information on the movement situation of the mobility 60 from the inertia sensor 30, and receive the front image of the mobility 60 from the camera 40.

The controller 50 can be configured to detect an object (for example, a 3D observation feature point) in the image based on the received image using an object detection algorithm to acquire 3D observation feature point data, delete non-collision 3D observation feature point data that does not collide with the mobility 60 from the 3D observation feature point data, reduce a dimension of the 3D observation feature point data to 2D observation feature point data using a known dimension reduction algorithm, and bind the 2D observation feature point data to surrounding 2D LiDAR point data using a known binding algorithm (for example, a factor graph).

In one example, the controller 50 can detect mobility movement data based on the information on the rotation of the driving motor or the wheel received from the encoder 20 or the information on the movement situation of the mobility 60 received from the inertia sensor 30 and select estimated positions of the mobility 60 based on the mobility movement data. In another example, the controller 50 can select the estimated positions of the mobility 60 based on the 2D LiDAR point data using a known localization algorithm (for example, AMCL). To select the estimated positions of the mobility 60, another method for positioning the mobility 60 other than the method described herein may be used.

The controller 50 can include a memory 52 and a map to which the 2D feature point data is bound can be stored in the memory 52. In one example, the map to which the 2D feature point data is bound can be a map created by the SLAM method according to an embodiment of the present disclosure that is previously executed and the map can include the 2D feature point data that is bound to the 2D LiDAR point data. However, the map to which the 2D feature point data is bound is not necessarily limited to the map created by the SLAM method according to the example embodiment of the present disclosure and as long as the 2D feature point data bound to the 2D LiDAR point data is included, a mapping method is not particularly limited. To distinguish the feature point data that is currently observed by the camera 40 from the feature point data included in the map, the feature point data that is currently observed by the camera 40 can be referred to as observation feature point data.

The controller 50 can compare the 2D observation feature point data that is bound to the 2D LiDAR point data with the 2D feature point data bound to the estimated position of the map. The controller 50 can compare the 2D observation feature point data that is bound to the 2D LiDAR point data with the 2D feature point data bound to the estimated position of the map to check a similarity using a known algorithm for checking a similarity of the feature point. Thereafter, the controller 50 can select the estimated position having the highest similarity as a final position of the mobility 60 and detect an absolute position of the mobility 60 by a global localization method, for example. The controller 50 can update the map to which the 2D feature point data is bound based on the absolute position of the localized mobility 60 and the 2D observation point data that is bound to the 2D LiDAR point data and can store the updated map in the memory 52.

The controller 50 can include one or more microprocessors and the one or more microprocessors may be programmed to perform operations of a SLAM method according to some embodiments of the present disclosure.

The controller 50 can be connected to the mobility 60 and generate a route of the mobility 60 or control the movement of the mobility 60 using the map updated by the SLAM method according to some embodiments of the present disclosure. For example, the controller 50 can control the mobility 60 to follow the object or control the mobility 60 to avoid the object.

Figure 3:
FIG. 3 is diagram that illustrates a 3D observation feature point detected by a camera according to some embodiments of the present disclosure.
Figure 4:
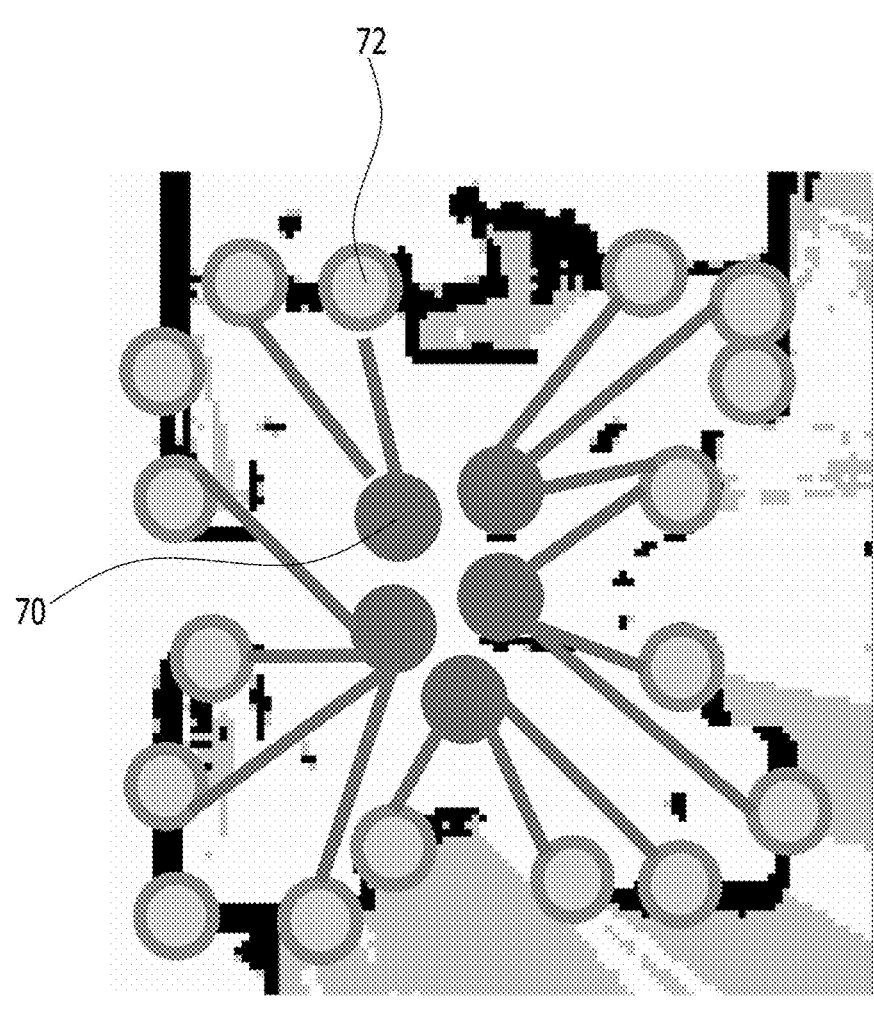
FIG. 4 is diagram that illustrates 2D observation feature point data bound to 2D LiDAR point data according to some embodiments of the present disclosure.
Figure 5:
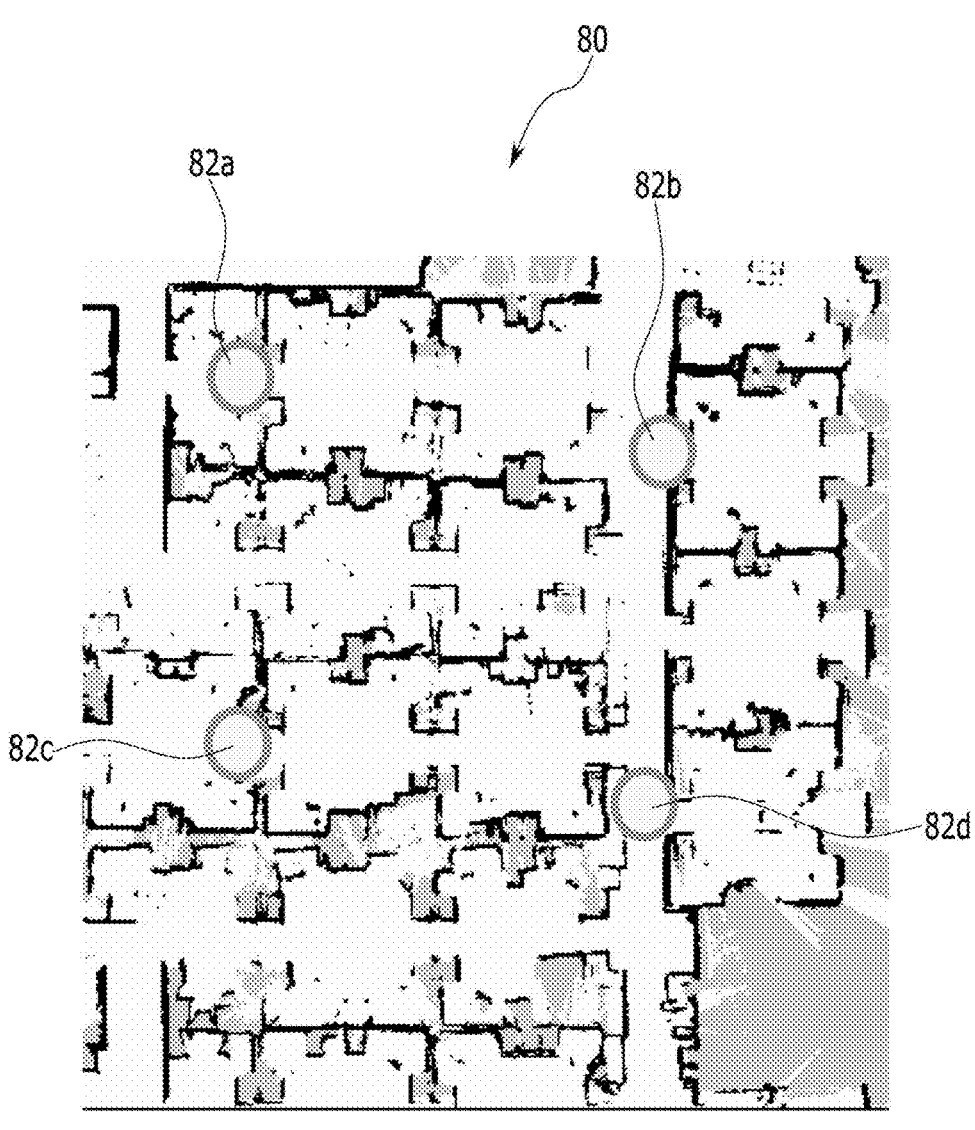
FIG. 5 is diagram that illustrates an estimated position of a mobility according to some embodiments of the present disclosure.
Figure 6:
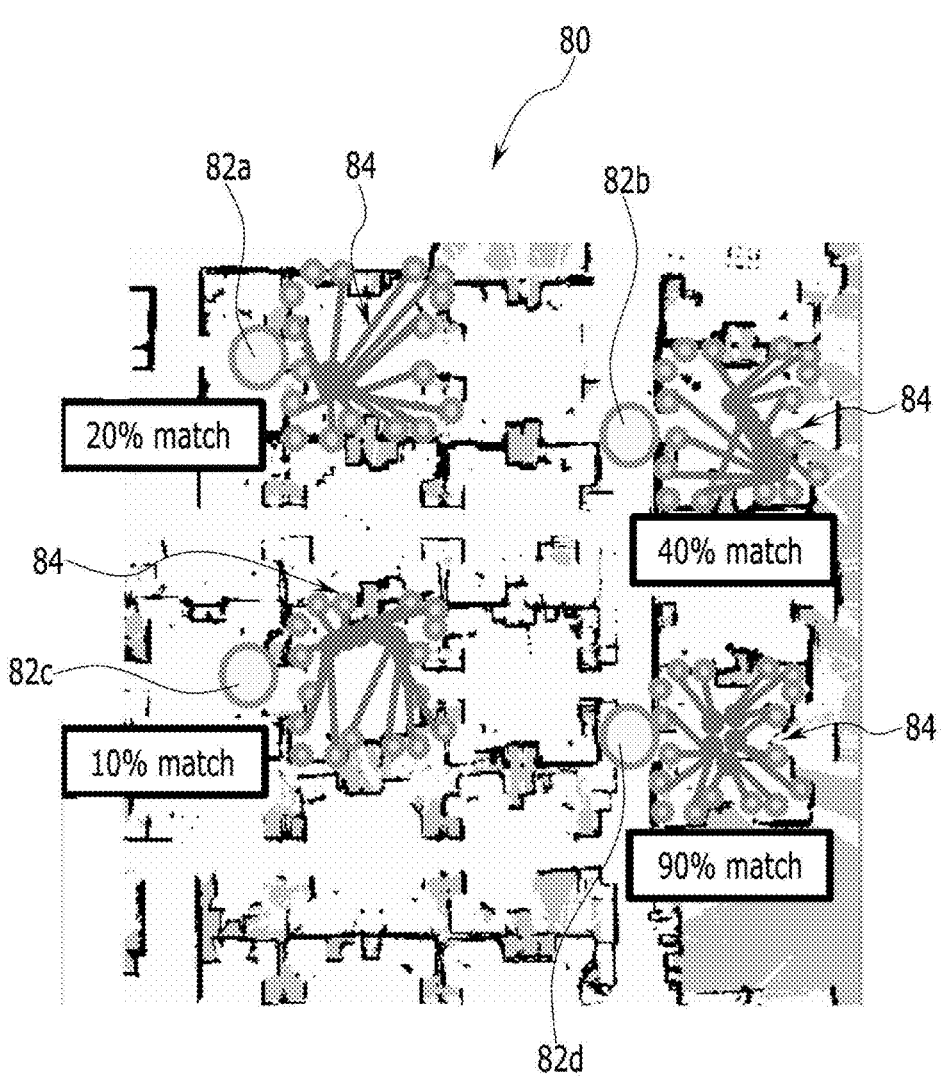
FIG. 6 is diagram that illustrates a result obtained by comparing bound observation feature point data and feature point data bound to an estimated position in a map according to some embodiments of the present disclosure.
Figure 7:
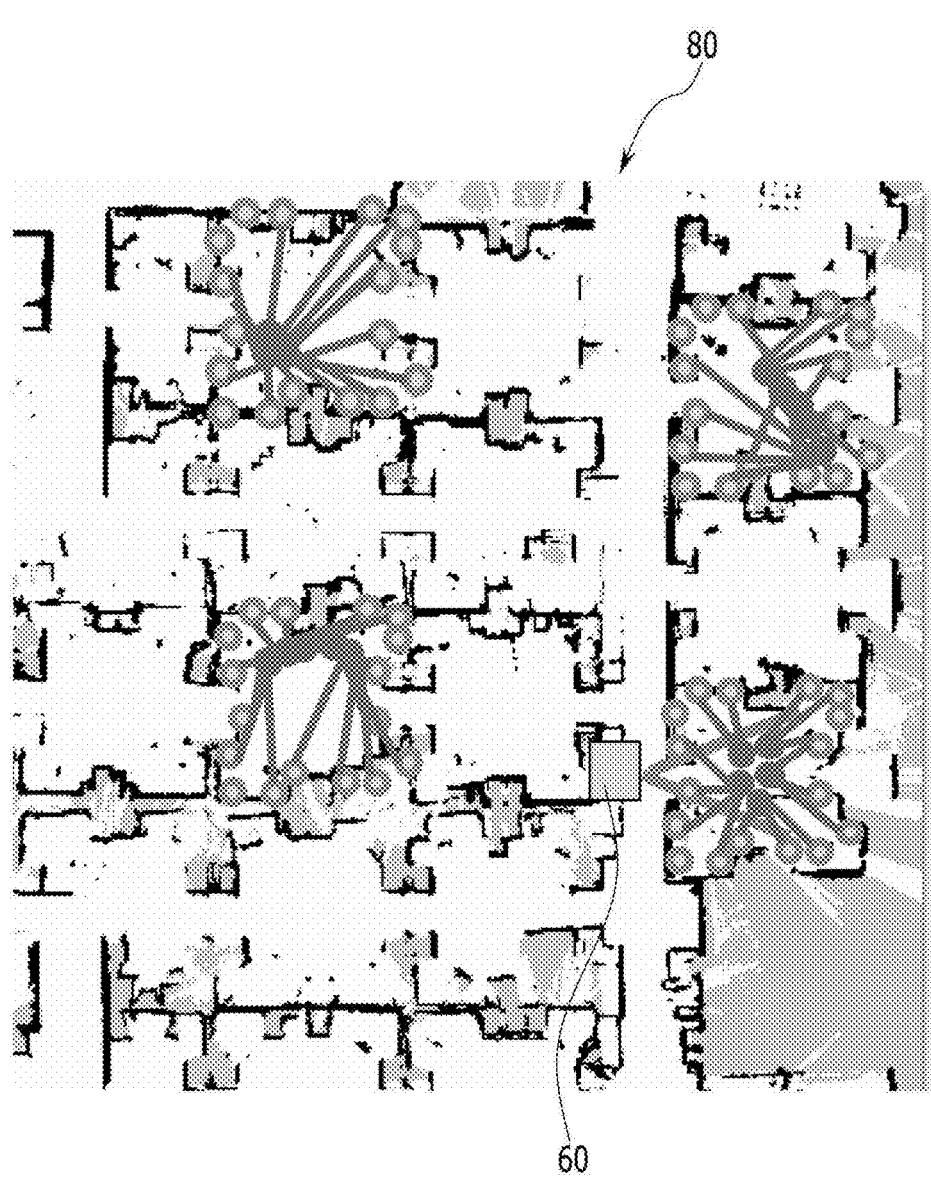
FIG. 7 is diagram that illustrates updating of a map to which a feature point is bound according to some embodiments of the present disclosure.

FIG. 2 is a flowchart of a simultaneous localization and mapping method according to an example embodiment of the present disclosure. FIG. 3 illustrates a 3D observation feature point detected by a camera in one example. FIG. 4 illustrates 2D observation feature point data bound to 2D LiDAR point data in one example. FIG. 5 illustrates an estimated position of a mobility in one example. FIG. 6 illustrates a result obtained by comparing bound observation feature point data and feature point data bound to an estimated position in a map in one example. FIG. 7 illustrates updating of a map to which a feature point is bound in one example.

As illustrated in FIGS. 2 to 7, a SLAM method according to an example embodiment of the present disclosure can start by loading the map 80 to which the 2D feature point data 84 is bound at operation S110. In one example, the map 80 to which the 2D feature point data 84 is bound is the map created by the SLAM method according to some embodiments of the present disclosure that has been executed previously and for example, as illustrated in FIG. 6, the map 80 includes the 2D feature point data 84 that is bounded to the 2D LiDAR point data (see lines connecting adjacent circles). The map 80 to which the 2D feature point data 84 is bound may be stored in the memory 52 of the controller 50.

The LiDAR 10 can be equipped in the mobility 60, can acquire the 2D LiDAR point data 72 at operation S120, and can transmit the acquired 2D LiDAR point data 72 to the controller 50. Further, the camera 40 can be equipped in the mobility 60, can acquire the front image of the mobility 60, and can transmit the acquired image to the controller 50. The controller 50 can acquire the 3D observation feature point data 70 in the image based on the received image using an object detection algorithm at operation S130. FIG. 3 illustrates an example that displays the 3D observation feature point data 70 in the image acquired by the camera 40.

When the 3D observation feature point data 70 is acquired, the controller 50 can delete the non-collision 3D observation feature point data that does not collide with the mobility 60 from the 3D observation feature point data 70 at operation S140. For example, the feature points above the highest point of the mobility 60 can be the non-collision feature points that are unlikely to collide with the mobility 60. Accordingly, the non-collision 3D observation feature point data that is unlikely to collide with the mobility 60 can be removed from the 3D observation feature point data 70 to reduce a computational amount. Specifications of the mobility 60 (for example, a diameter of the wheel or a maximum height of the mobility 60) can be stored in the memory 52 and the controller 50 can select the non-collision 3D observation feature point data based on the specifications of the mobility 60. The operation S140 can be an optional operation of a given method according to some embodiments of the present disclosure.

The controller 50 can reduce the dimension of the 3D observation feature point data 70 from which the non-collision 3D observation feature point data is deleted to the 2D observation feature point data 70 using a dimension reduction algorithm at operation S150. The dimension reduction algorithm that reduces a dimension of the 3D data to the 2D data can be apparent to a person of an ordinary skill in the art and accordingly a detailed description thereof can be omitted.

The controller 50 can bind the 2D observation feature point data 70 to the surrounding 2D LiDAR point data 72 using a binding algorithm (for example, a factor graph) at operation S160. FIG. 4 illustrates examples of 2D observation feature point data 70 bound to at least some of the 2D LiDAR point data 72. For example, each of five observation feature point data 70 can be bound to two or more 2D LiDAR point data 72. In one example, using the binding algorithm, the feature point can be bound to the LiDAR point based on a distance and/or a direction between the feature point and the LiDAR point. Such a binding algorithm can be apparent to a person of an ordinary skill in the art and accordingly a detailed description thereof can be omitted.

The controller 50 can select the estimated positions 82*a*, 82*b*, 82*c*, and 82*d* of the mobility 60 by a positioning method of the mobility 60 at operation S170. The positioning method using the 2D LiDAR 10, the encoder 20, and/or the inertia sensor 30 may include an error in the indoor environment. To reduce the error, in some embodiments, the controller 50 does not confirm the position of the mobility 60 detected using the 2D LiDAR 10, the encoder 20, and/or the inertia sensor 30, but instead can select the estimated positions that are estimated that the mobility 60 is located. In FIG. 5, it is illustrated that first, second, third, and fourth estimated positions 82*a*, 82*b*, 82*c*, and 82*d* can be selected.

After the estimated position of the mobility 60 is selected, the controller 50 can compare the 2D observation feature point data 70 bound to the 2D LiDAR point data 72 with the 2D feature point data 84 bound to the estimated positions 82*a*, 82*b*, 82*c*, and 82*d* on the map 80 at operation S180. The controller 50 can check the similarity of the 2D observation feature point data 70 bound to the 2D LiDAR point data 72 with the 2D feature point data 84 bound to the estimated positions 82*a*, 82*b*, 82*c*, and 82*d* on the map 80 using an algorithm of checking a similarity through a shape and a position of the feature point and can select the estimated position having the highest similarity as the final position of the mobility 60 at operation S190.

For example, as illustrated in FIG. 6, a similarity between the 2D observation feature point data 70 based on the first estimated position 82*a* and the 2D feature point data 84 is 20%, a similarity between the 2D observation feature point data 70 based on the second estimated position 82*b* and the 2D feature point data 84 is 40%, a similarity between the 2D observation feature point data 70 based on the third estimated position 82*c* and the 2D feature point data 84 is 10%, and a similarity between the 2D observation feature point data 70 based on the fourth estimated position 82*d* and the 2D feature point data 84 is 90%. Accordingly, the fourth estimated position 82*d* having the highest similarity can be selected as the final position of the mobility 60.

Thereafter, the controller 50 can detect the absolute position of the mobility 60 based on the selected final position using a global localization method at operation S200. As illustrated in FIG. 7, the controller 50 can determine that the mobility 60 is located in the fourth estimated position 82d and detect the position of the mobility 60 based on the 2D observation feature point data 70 bound to the 2D LiDAR point data 72 using a global localization method.

The controller 50 can update the map 80 to which the 2D feature point data 84 is bound based on the absolute position of the mobility 60 and the 2D observation feature point data 70 bound to the 2D LiDAR point data 72, and can store the updated map 80 in the memory 52. In the updated map 80, the 2D observation feature point data 70 bound to the 2D LiDAR point data 72 can be stored as the 2D feature point data 84 bound to the 2D LiDAR point data 72.

While some embodiments of the present disclosure have been described in connection with what is presently considered to be practical example embodiments, it can be understood that the present disclosure is not necessarily limited to the disclosed example embodiments. On the contrary, the present disclosure is intended to cover various modifications and equivalent arrangements included within the spirit and scope of the appended claims.

What is claimed is:

1. A localization and mapping method, the method comprising:

acquiring 2D LiDAR point data from a light detection and ranging device (LiDAR) of a mobility;

acquiring three dimension (3D) observation feature point data by receiving an image from a camera of the mobility;

reducing a dimension of the 3D observation feature point data to 2D observation feature point data;

before the reducing the dimension of the 3D observation feature point data to the 2D observation feature point data, deleting non-collision 3D observation feature point data for features that are not able to cause a collision with the mobility from the 3D observation feature point data;

binding the 2D observation feature point data to the 2D LiDAR point data; and detecting an absolute position of the mobility based on the 2D observation feature point data bound to the 2D LiDAR point data and based on a map to which 2D feature point data is bound.

2. The method of claim 1, wherein detecting the absolute position of the mobility comprises:

selecting an estimated position of the mobility;

comparing the bound 2D observation feature point data with the 2D feature point data bound to the estimated position of the map; and selecting a final position of the mobility based on the comparing.

3. The method of claim 2, wherein selecting the final position of the mobility comprises checking a similarity of the bound 2D observation feature point data and the 2D feature point data bound to the estimated position of the map.

4. The method of claim 2, wherein selecting the estimated position of the mobility comprises localizing the mobility.

5. The method of claim 1, further comprising updating the map to which the 2D feature point data is bound based on the absolute position of the mobility and based on the 2D observation feature point data bound to the 2D LiDAR point data.

6. The method of claim 5, further comprising storing the updated map in a memory.

7. The method of claim 1, wherein specifications of the mobility are stored in a memory and the method further comprises selecting the non-collision 3D observation feature point data based on the specifications of the mobility.

8. A localization and mapping system comprising:

a light detection and ranging device (LiDAR) mounted on a mobility and configured to detect two dimension (2D) LiDAR point data;

a camera mounted on the mobility and configured to acquire an image; and a controller configured to:

receive the 2D LiDAR point data from the LiDAR;

receive the image from the camera;

detect three dimension (3D) observation feature point data from the image;

reduce a dimension of the 3D observation feature point data to 2D observation feature point data;

before reducing the dimension of the 3D observation feature point data to the 2D observation feature point data, to delete non-collision 3D observation feature point data for features that are not able to cause a collision with the mobility from the 3D observation feature point data;

bind the 2D observation feature point data to the 2D LiDAR point data; and detect an absolute position of the mobility based on the 2D observation feature point data bound to the 2D LiDAR point data and based on a map to which two dimension (2D) feature point data is bound.

9. The system of claim 8, wherein the controller is further configured to select an estimated position of the mobility, compare the bound 2D observation feature point data with the 2D feature point data bound to the estimated position of the map, and select a final position of the mobility based on the compare.

10. The system of claim 9, wherein the controller is further configured to select the final position of the mobility by checking a similarity of the bound 2D observation feature point data and the 2D feature point data bound to the estimated position of the map.

11. The system of claim 9, further comprising a movement data sensor mounted on the mobility and configured to detect movement data of the mobility, wherein the controller is further configured to select the estimated position of the mobility by localization of the mobility based on one of or both of the 2D LiDAR point data and the movement data of the mobility.

12. The system of claim 8, wherein the controller is further configured to update the map to which the 2D feature point data is bound based on the absolute position of the mobility and based on the 2D observation feature point data bound to the 2D LiDAR point data.

13. The system of claim 12, wherein the controller is further configured to store the updated map in a memory.

14. The system of claim 8, wherein specifications of the mobility are stored in a memory and the controller is further configured to select the non-collision 3D observation feature point data based on the specifications of the mobility.

15. A mobility comprising:

a driving motor;

a wheel;

an encoder configured to detect information on a rotation of the driving motor or the wheel;

an inertial sensor configured to detect information on a movement situation of the mobility;

a light detection and ranging device (LiDAR);

a camera;

a controller; and a memory storing instructions, that when executed by the controller cause the controller to:

receive 2D LiDAR point data from the LiDAR, receive an image from the camera, detect three dimension (3D) observation feature point data from the image, reduce a dimension of the 3D observation feature point data to 2D observation feature point data, before reducing the dimension of the 3D observation feature point data to the 2D observation feature point data, to delete non-collision 3D observation feature point data for features that are not able to cause a collision with the mobility from the 3D observation feature point data, bind the 2D observation feature point data to the 2D LiDAR point data, select an estimated position of the mobility based on the 2D LiDAR point data, information on the rotation of the driving motor or the wheel detected by the encoder, and information on a movement of the mobility detected by the inertial sensor, and detect an absolute position of the mobility based on the 2D observation feature point data bound to the 2D LiDAR point data and based on a map to which two dimensional (2D) feature point data is bound.

16. The mobility of claim 15, wherein specifications of the mobility are stored in the memory and the controller is further configured to select the non-collision 3D observation feature point data based on the specifications of the mobility.

17. The mobility of claim 15, wherein the controller is further configured to select the estimated position of the mobility, compare the bound 2D observation feature point data with the 2D feature point data bound to the estimated position of the map, and select a final position of the mobility based on the compare.

18. The mobility of claim 17, wherein the controller is further configured to select the final position of the mobility by checking a similarity of the bound 2D observation feature point data and the 2D feature point data bound to the estimated position of the map.

19. The mobility of claim 17, further comprising a movement data sensor mounted on the mobility and configured to detect movement data of the mobility, wherein the controller is further configured to select the estimated position of the mobility by localization of the mobility based on one of or both of the 2D LiDAR point data and the movement data of the mobility.

20. The mobility of claim 15, wherein the controller is further configured to update the map to which the 2D feature point data is bound based on the absolute position of the mobility and based on the 2D observation feature point data bound to the 2D LiDAR point data.

* * * * *